June 5, 1956 F. W. M. STEYER 2,749,176
ELECTRO METAL SPRAYING PISTOL
Filed Sept. 18, 1952 12 Sheets-Sheet 1

INVENTOR
FRIEDRICH WILHELM MARTIN
STEYER.
BY: TOWNSEND. F. BEAMAN.
ATTORNEY.

June 5, 1956  F. W. M. STEYER  2,749,176
ELECTRO METAL SPRAYING PISTOL
Filed Sept. 18, 1952  12 Sheets-Sheet 2

INVENTOR
FRIEDRICH WILHELM MARTIN STEYER.
BY: TOWNSEND. F. BEAMAN
ATTORNEY.

June 5, 1956 F. W. M. STEYER 2,749,176
ELECTRO METAL SPRAYING PISTOL
Filed Sept. 18, 1952 12 Sheets-Sheet 4

INVENTOR
FRIEDRICH WILHELM MARTIN
STEYER.
BY: TOWNSEND F. BEAMAN
ATTORNEY.

June 5, 1956　　　F. W. M. STEYER　　　2,749,176
ELECTRO METAL SPRAYING PISTOL
Filed Sept. 18, 1952　　　　　　　　　　12 Sheets-Sheet 5
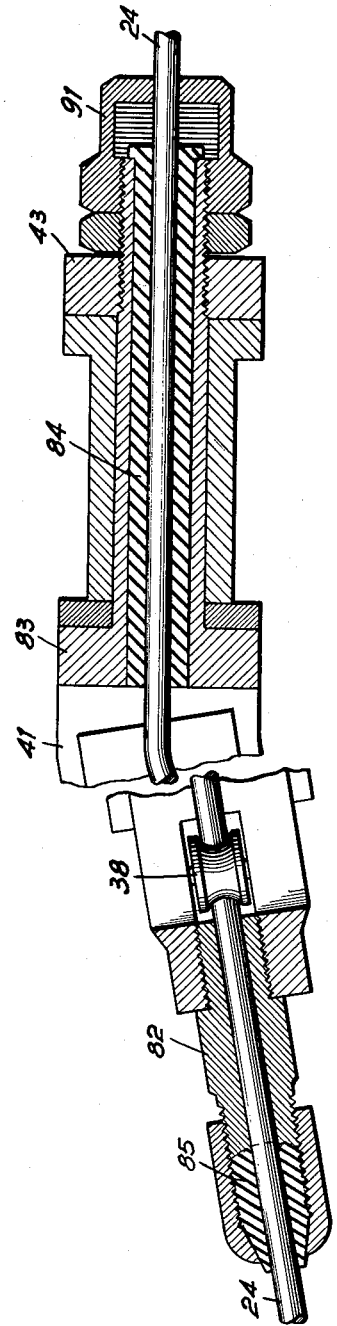
INVENTOR
FRIEDRICH WILHELM MARTIN
STEYER.
BY: TOWNSEND. F. BEAMAN.
ATTORNEY.

June 5, 1956  F. W. M. STEYER  2,749,176
ELECTRO METAL SPRAYING PISTOL
Filed Sept. 18, 1952  12 Sheets-Sheet 6
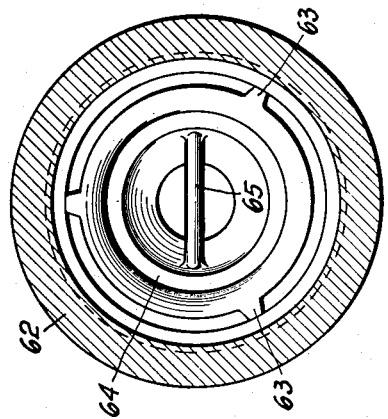
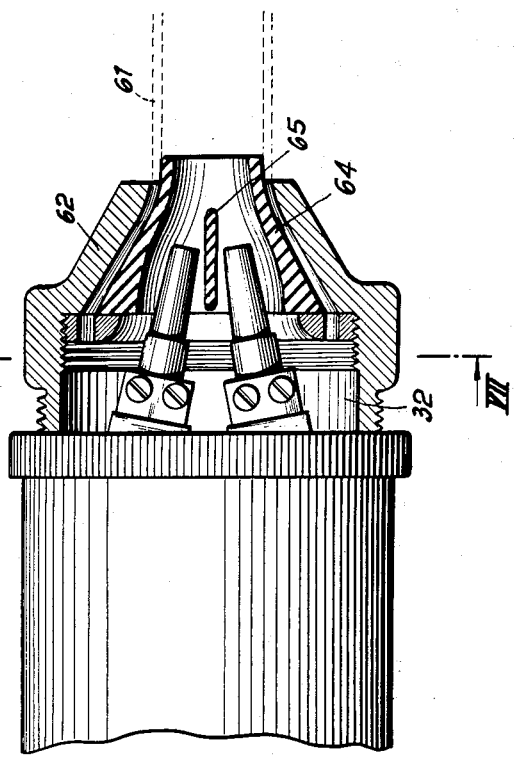
INVENTOR
FRIEDRICH WILHELM MARTIN
STEYER.
BY: TOWNSEND F. BEAHAN.
ATTORNEY.

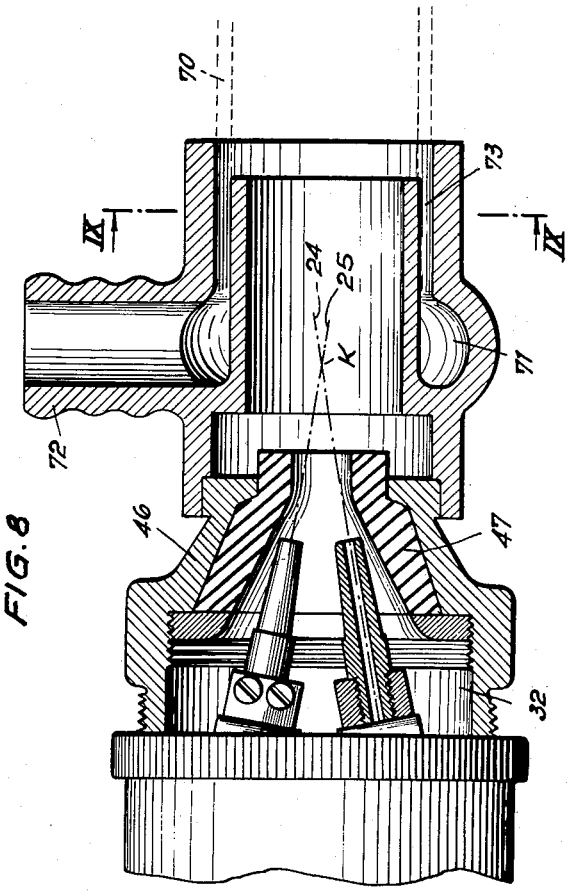

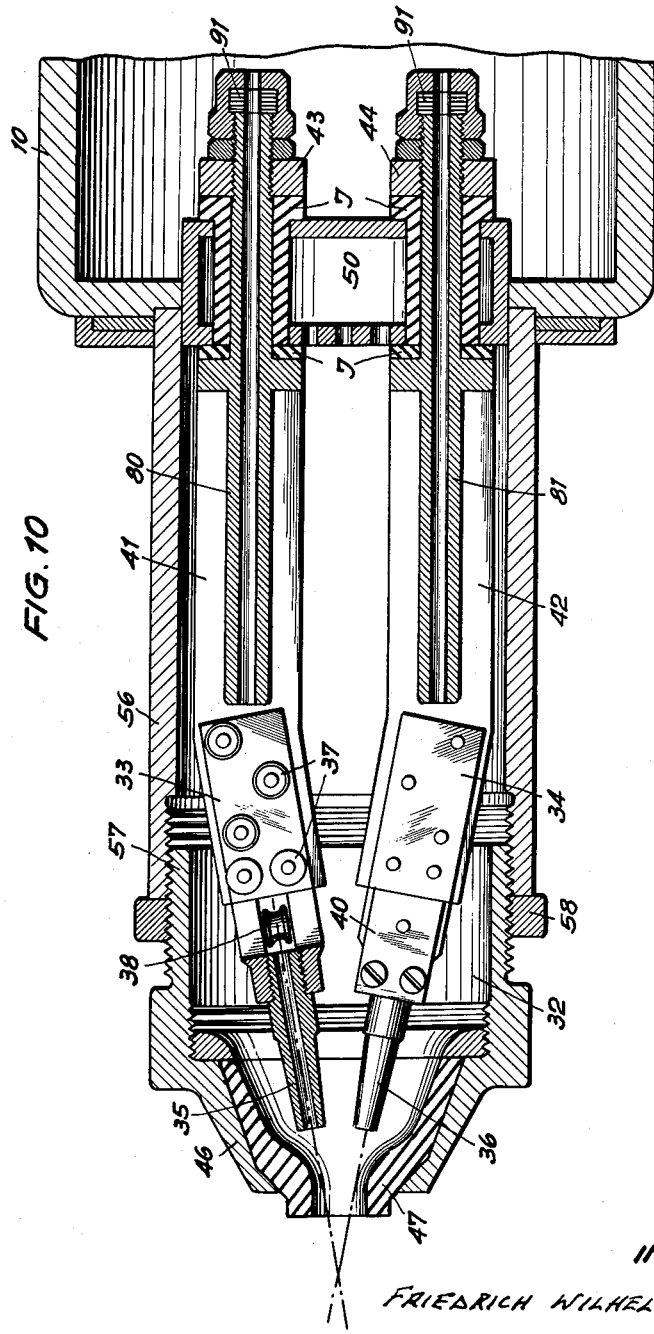

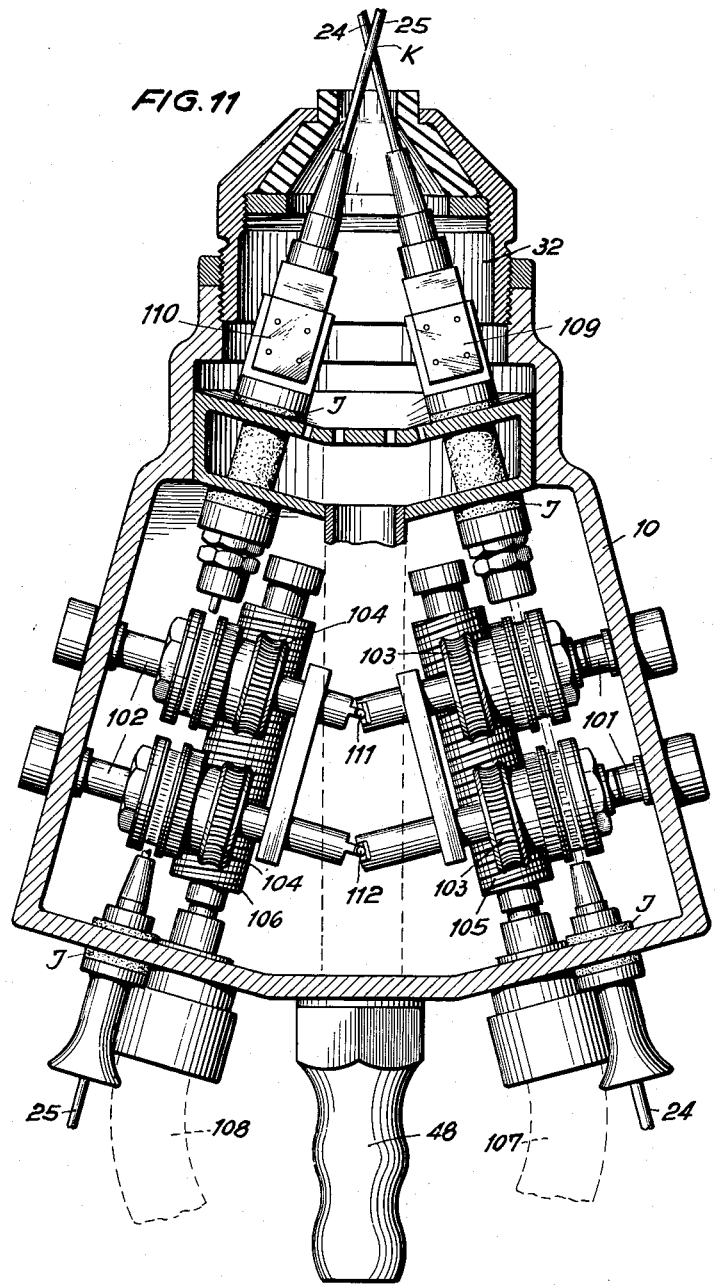

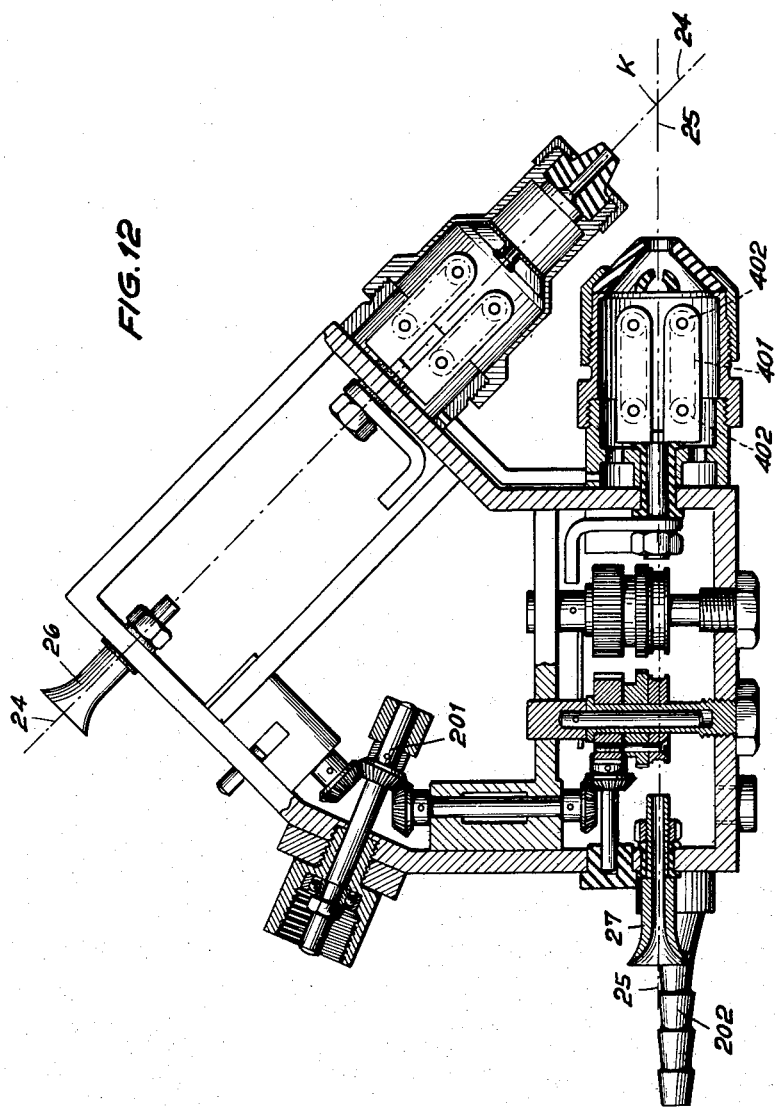

June 5, 1956 F. W. M. STEYER 2,749,176
ELECTRO METAL SPRAYING PISTOL
Filed Sept. 18, 1952 12 Sheets-Sheet 11

INVENTOR
FRIEDRICH WILHELM MARTIN
STEYER.
BY: TOWNSEND. F. BEAMAN
ATTORNEY.

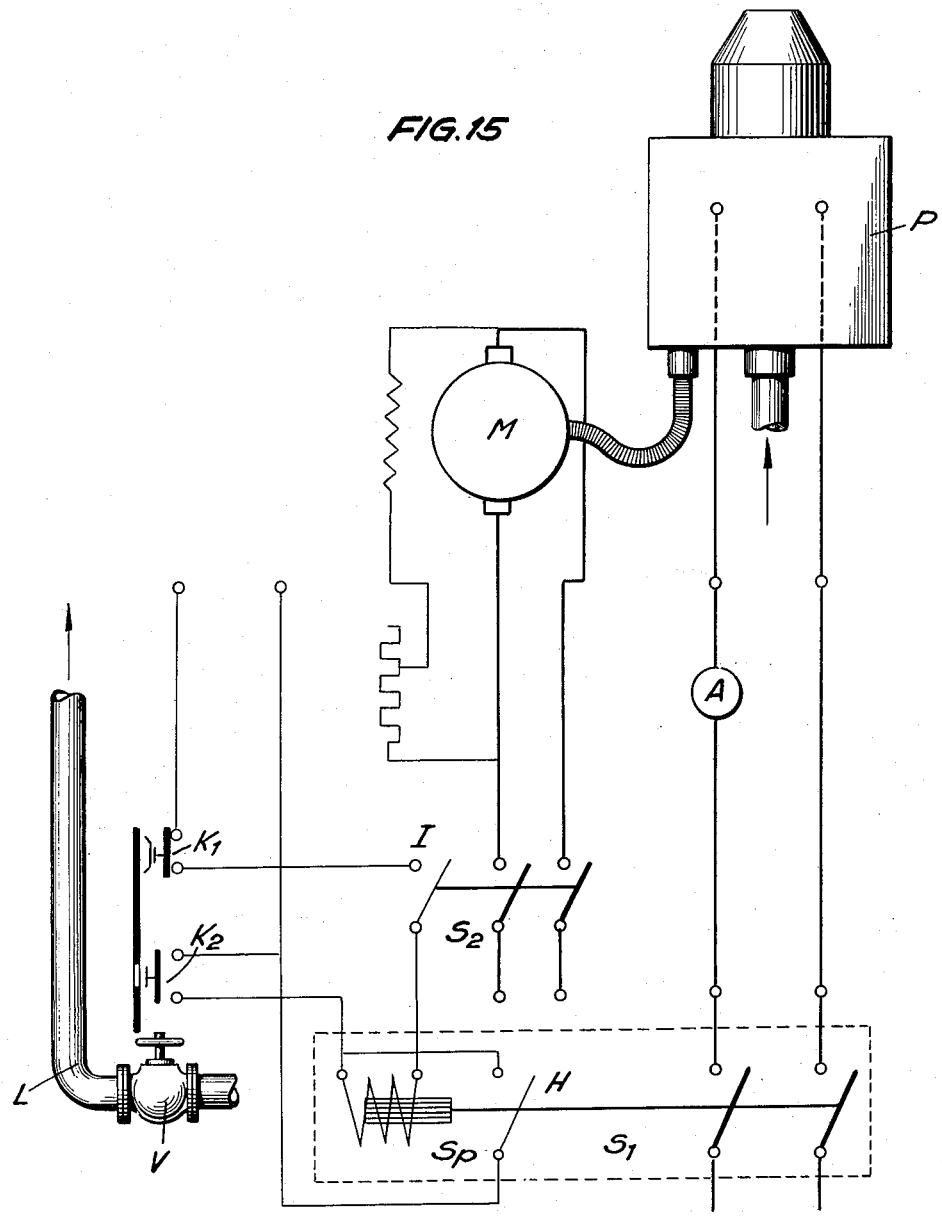

United States Patent Office 2,749,176
Patented June 5, 1956

2,749,176

ELECTRO METAL SPRAYING PISTOL

Friedrich Wilhelm Martin Steyer, Hamburg, Germany, assignor, by mesne assignments, to Arnold Otto Meyer, Hamburg, Germany, a corporation of Germany Application September 18, 1952, Serial No. 310,319

17 Claims. (Cl. 299—28.8)

This invention relates to spraying pistols and more particularly to electro-spraying pistols for melting the ends of two electrically live wires by continually short-circuiting them and causing them to sputter the resulting molten metal particles in a jet onto the surface of work bodies of any kind. In these pistols, the wires to be sprayed or sputtered are separately moved or fed to a point of mutual wire contact so as to cause the flow of current of sufficient high intensity to produce a short circuit arc melting the wire ends for spraying the molten metal by means of a stream of compressed fluid, such as air.

It is an object of the present invention to provide an improved pistol of this type which insures a proper feeding of the wires to the short circuit arc so as to allow an uninterrupted operation of the pistol without any attention of the operator being necessary in this respect.

Another object of the present invention resides in the provision of an electric spraying pistol which permits the use of wires of a material which may be hardened, such as steel, having a greater diameter of 1.5 to 3 mm. for instance.

The invention also has for its object to increase the life of a metal spraying pistol by overcoming the difficulties encountered in connection with the electrical heating of the metal wires and preventing undue overheating and wear upon the parts of the pistol which are required to provide contact surfaces for guiding the wire to the point at which arcing is required to take place.

These and other objects, features and advantages of the present invention will be more fully explained with reference to the accompanying drawings showing for the purpose of illustration some preferred embodiments of the electro-spraying pistol according to the present invention, it being understood that the following description is not designed as a definition of the invention. In the drawings:

Fig. 5 shows a longitudinal section of one wire guide way of a modified embodiment;

Fig. 6 shows a longitudinal section through the mouth piece of the pistol according to a further modified embodiment;

Fig. 7 is a cross-section according to section line VII—VII of Fig. 6;

Fig. 8 shows a longitudinal section of the pistol mouth piece according to a still further modification;

Fig. 9 is a cross-section according to section line IX—IX of Fig. 8;

Fig. 10 shows a longitudinal section of the pistol front part which is elongated according to another embodiment;

Fig. 11 is a longitudinal section of an embodiment in which the wire guide way or passage is straight up to the melting arc;

Fig. 12 shows an embodiment partly in longitudinal section somewhat differing from that shown in Fig. 11;

Fig. 15 is a diagrammatic view of the electrical connections for the operation of the pistol.

Figure 1:
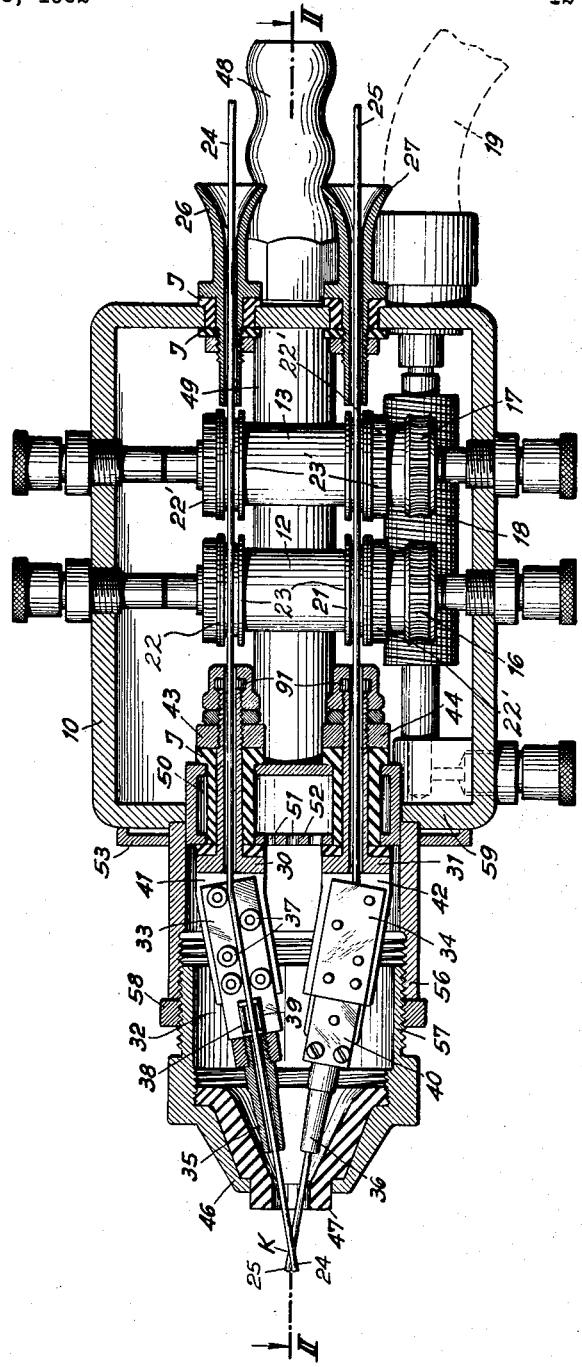
Fig. 1 is a longitudinal section of one form of spraying pistol according to the invention in the plane of the two wires fed through the pistol to the melting arc point.

Referring first to Figures 1 to 4, the metal spraying pistol illustrated therein comprises a main casing 10 provided with a cover 11, shown hinged to the casing at 11' and carrying pairs of wire feeding rollers 14 and 15, 15' (Fig. 4) arranged in spaced apart relation with respect to the direction of feed of the metal wires 24 and 25 through the casing.

The rollers 14 and 15, 15' are shown as being carried upon lever arms 14" and 15" pivoted upon the inside of the cover, as indicated at 14'" and 15'". Springs 28 and 29 serve to bias the rollers 14 and 15, 15' towards companion pairs of feed rollers 12 and 13 mounted within the casing 10. These springs can be adjustable to vary the pressure applied through the rollers 14 and 15, 15' against the wires 24 and 25 guided and fed through the cooperating pairs of feed rollers.

The rollers 12 and 13 carry worm wheels 16 and 17, respectively, which are in mesh with a common worm 18 mounted within the casing 10 and arranged to be driven by an electric motor (not shown), as through the medium of a flexible cable 19. The rollers 12 and 13, therefore, are positively driven.

In addition to the worm wheels 16 and 17, the rollers 12 and 13 each carry a pair of axially spaced toothed rings 22, 22', respectively, and adjacent thereto, a pair of channeled rims 23, 23', respectively.

The rollers 14 and 15 on the cover 11, each carry a pair of axially spaced toothed rings 20, 20' respectively, in mesh with the companion toothed rings 22 and 22', respectively. The rollers 14 and 15 also carry rims 20" companion to the channelled rims on the shafts 12 and 13. The channeled rims 23, 23' and their companion rims 20" combine, in the closed position of the cover 11, to define enclosed channels in which the wires 24 and 25 engage and are fed forwards to the pistol nozzle head, indicated at 32, from a supply source (not shown).

With the cover 11 closed, and the worm 18 rotated, the toothed rings 22, 22' will be positively driven in unison and, being in mesh with their companion toothed rings 20, 20' on the rollers 14 and 15, will impart rotation to these rollers.

The wires 24 and 25 to be sputtered or sprayed enter into the casing 10, 11 through introduction tubes or spouts 26 and 27 respectively, which are mounted in the casing by means of sleeves or discs of insulating material, as for instance vulcanized fibre or the like. From the spouts 26 and 27 the wires go to the channels defined between the rims on the feeding rollers 12 and 13 and the counter rollers 14 and 15.

After leaving the feeding rollers wires 24 and 25 enter guiding sleeves 30, 31 respectively, and then pass into the nozzle head. Within the nozzle head the wires are bent, by means of bending rollers 33 and 34, so as to be led together to a point K (see Fig. 1) located outside the nozzle head. At point K the two wires 24 and 25 contact each other for producing a short circuit arc. Between the bending rollers 33 and 34 and the discharge opening of the nozzle head there are arranged straight guiding nozzles 35 and 36. These straight guiding nozzles and the guiding sleeves 30 and 31 may be of metal or any other inorganic material, preferably such a material which has a greater hardness than the metal of the wires to be sprayed or sputtered. In the roller ways 33 and 34 the wires are guided between rollers 37, 38 and 39 some or all of which may be provided with guiding grooves, if desired. Preferably, the axes of the rollers 37 are arranged at right angle with respect to the axis of the rollers 38 and 39.

The roller ways 33, 34 which, together with the nozzles 35 and 36 serve as bending means, form two unit structures and are mounted for angular adjustment on brackets 41 and 42. As to be seen from Fig. 2, the guiding sleeves 30 and 31 are arranged at the rear part of the brackets 41 and 42 respectively. By an angular adjustment of the brackets 41 and 42 in a plane parallel to the plane of the wires 24 and 25 the distance of the wire contact point K from the front end of the pistol mouth piece may be varied within any convenient range.

Figure 2:
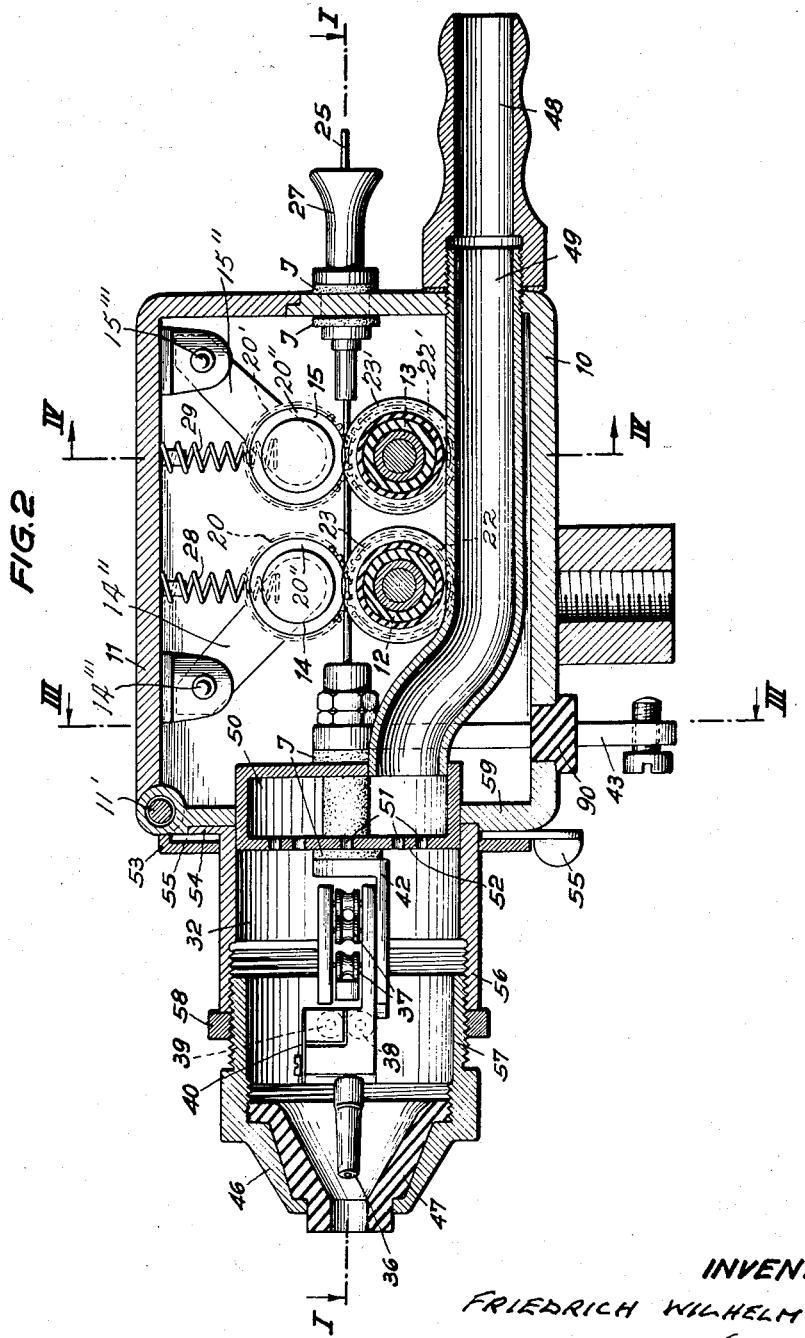
Fig. 2 is a longitudinal section taken on the line II—II of Fig. 1.
Figure 3:
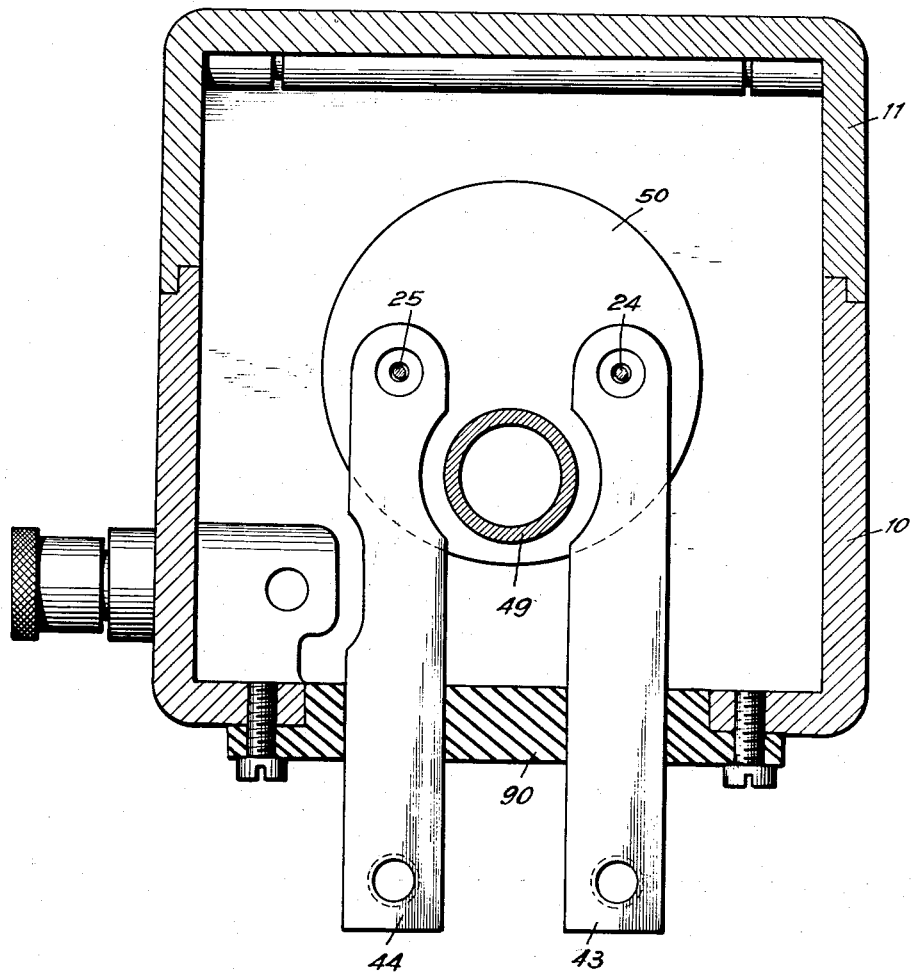
Fig. 3 is a cross-section taken on the line III—III of Fig. 2.
Figure 4:
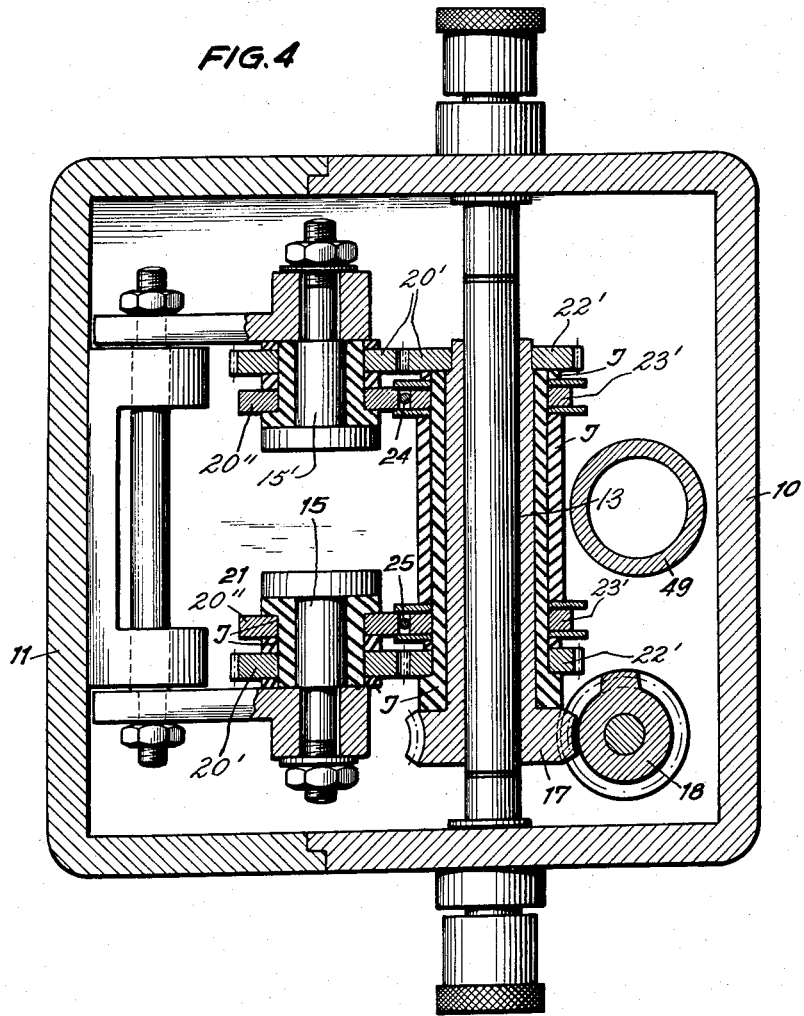
Fig. 4 is a cross-section taken on the line IV—IV of Fig. 1.

The intensity of the current for supplying the melting arc is dependent on the diameter and on the material of the wires to be sprayed or sputtered as well as on the wire feeding velocity. The current is supplied to the pistol by means of rails 43 and 44 which are insulated with respect to the casing by an insulating member 90. These rails are connected to the guiding sleeves 30 and 31 and have a good electrical connection with respect to the bending means 33 and 34 and the sleeves 30 and 31. Therefore, the transmission of current transition to the wires is mainly effected by the bending rollers 37 and especially by the contact rollers 38 and 39, which rollers are resiliently pressed against the wires, as for instance by means of leaf springs 40, as shown in Fig. 2. In this manner, undesirable current transmission to the wires from the metallic guiding nozzles 35 and 36 and from the guiding sleeves 30 and 31 can be materialy reduced. For completely removing current transmission at the last named points guiding nozzles 82 (see Fig. 5) of ceramic material and preferably having a great resistance to heat may be provided. Furthermore, to this end the guiding sleeves 83 may be provided over their entire length with inner sleeves 84 of any suitable insulating material, for instance ceramic material, as likewise shown in Fig. 5. With a view to avoiding wear of the guiding nozzles as much as possible it is advisable to use for these nozzles a material which not only has a great resistance to heat but also great resistance to wear and tear. As to be seen from Fig. 5, it is also possible to provide guiding nozzles only a part of which, as preferably the discharge or exit end, consists of a ceramic material.

In order to clean the surface of the wires from any adherent dirt and metal particles convenient means may be provided such as cleaning chambers 91 arranged in the manner of stuffing boxes or packing bushes at the entrance end of the guiding sleeves 30 and 31 and comprising felt pads or cushions impregnated with oil which remove any dirt or the like adhering to the wires upon their passage through the respective chamber 91.

As will be readily understood, the metal parts of the wire entrance guides into the casing, of the feeding roller gear, of the bending means and of other parts contacting the live metal wires are insulated with respect to the casing of the pistol by any convenient insulating members such as sleeves, discs or bushes J. Alternatively the casing itself may be made of insulating material as for instance of Bakelite or the like. In such an event, it is desirable to provide an armouring for the casing, for instance a metal sheathing or any other equivalent means so as to increase the mechanisal resistance of the casing. Of course, the rolling bobbins not shown, from which the wires 24 and 25 are wound off must be likewise insulated with respect to earth.

The conical mouth piece 46 of the nozzle head is preferably lined with a substantially conical sleeve 47 of insulating material so as to avoid contact between the live wires and the metallic casing parts. In this respect, it is to be noted that ceramic insulating material having great resistance to heat should be used for this sleeve 47 in view of the high temperatures produced by the short circuit arc. As shown in Fig. 6, this insulating sleeve can also be provided with an insulating central partition 65 thereby, preventing the wires from having any undesired contact with each other within the nozzle head.

The pistol is adapted to be supplied with compressed air for spraying or sputtering the metal melted at the wire contact point K and for projecting the glowing metal particles onto the surface of a work piece to be sprayed. Accordingly, the pistol has a tube joint 48 adapted to be connected to any pressure source, not shown, for supplying compressed air having a pressure of preferably more than 35.5 lb./sq. inch. A channel 49 leads from the tube joint 48 to an air chamber 50 having a front wall 52 provided with a large number of bores or orifices 51 uniformly distributed over the wall surface (see Figs. 1 and 2). Accordingly, the compressed air flows from the chamber 50 through the orifices 51 into the nozzle head 32. In the mouth piece 46, 47 the air stream assumes a conical shape and escapes from the mouth piece in the form of a jet having a small cone angle so that accordingly the jet of the molten metal sprayed onto the work piece is in the form of a small angle diverging cone. It has been found that it is preferable to guide the air flow of compressed air through the pistol in such a manner that the compressed air will be dammed up within the pistol. With this in view, therefore, the cross-sectional area of the compressed air flow upon entering the pistol should be greater than the cross-sectional area upon entering the chamber 50. Furthermore, the last named area should be greater than the cross-sectional area of the compressed air stream upon entering the nozzle head and finally this area again should be greater than the cross-sectional area of the compressed air stream being discharged from the nozzle head.

According to the modification shown in Fig. 6, the compressed air stream may be combined with a second annular air jet 61 which escapes from the nozzle head concentrically to the central jet and thus cylindrically surrounds the cone of divergence of the central jet. The annular jet 61 comes from an annular slot in the mouth piece of the nozzle head communicating with the hollow space thereof. As to be seen from Fig. 6, this annular slot may be provided for instance between the outer wall 62 of the mouth piece and the inner sleeve 64 having three longitudinal ribs 63 on its outer surface (see Fig. 7). The annular slot or channel within the mouth piece itself may be replaced by an additional tube member 71 mounted at the front end of the mouth piece as shown in Fig. 8. This member 71 comprises a tube joint 72 for supplying compressed air entering an annular channel 73 and forming a cylindrical jet 70 similar to that described with reference to Fig. 6.

It is desirable to take care for a proper accessibility of the wire bending means 33 and 34 and the guiding nozzles 35 and 36. For this reason, the nozzle head 32 is connected to the front wall 59 of the casing 10 by means of a bayonet joint 53, 54, 55 (see Fig. 2). The axial length of the nozzle head may be varied within predetermined limits corresponding to the adjustability of the position of the wire contact point K. For this purpose, the wall portions 56 and 57 of the head 32 are screw threaded and provided with a fixing nut 58 (see Fig. 2).

In the event the surfaces to be sprayed or sputtered have a difficult accessibility it is advisable to increase the length of the nozzle head so as to avoid any obstruction of the spraying operation by the pistol casing or housing containing the feeding roller gear so that the casing dimensions of its cross-section cannot be reduced below a predetermined minimum. Upon increasing the length of the nozzle head care must be taken for a proper guiding of the wires 24 and 25 from the feeding roller gear up to the entrance into the wire bending means 33 and 34. Otherwise, the wires may collapse easily and thus interrupt the continual spraying operation. Therefore, in such an event, correspondingly elongated guiding sleeves 80 and 81 are shown as provided in Fig. 10. The same result with a view of preventing the wires from collapsing may be obtained by means of guiding rollers which are similar to the rollers 37 and 38 of the bending means 33 and 34 and which are to be mounted between the discharge end of the guiding sleeves 30 and 31 and the entrance ends of the bending means 33 annd 34.

A tube like screen or any other equivalent means is preferably provided at the front surface of the nozzle head for protecting the operator against ultraviolet radiation as well as against glowing metal particles and for enabling the operator to work without any additional protecting means, such as goggles, gloves and the like. It may be noted in this respect, that the additional tube member 71 according to the embodiment shown in Fig. 8 may serve also for such protecting purposes. Generally, for that purpose only a simple, for instance cylindrical tube member, may be provided surrounding the contact point K and the arc and consisting of metal or any other material having a sufficient resistance to heat. If desired, the protecting tube member may be transparent. However, it is to be noted in this respect that it is advisable to avoid a material comprising quartz.

From the foregoing description it follows that in the embodiments of the pistol above referred to the wires to be sprayed or sputtered are fed parallel to each other to the bending means which bend the wires for leading them to the contact point or the arc K. However, it is also possible to have the wires fed up to that point K without any bending. As shown in Fig. 11, the wires are not parallel to each other but inclined so that likewise the axis of the multiple roller gears for feeding the wires are inclined to each other and form an obtuse angle. The feeding rollers 101, 102 are driven by means of worm wheels 103, 104. In distinction from the embodiment shown in Fig. 1, there are provided two separate worms 105, 106 connected to a flexible shaft 107, 108 respectively. In this embodiment, usually the wire bending means may be omitted provided that the two wires are fed in a straight line to the arc. Instead of the wire bending means, roller ways 109, 110 may be employed similar to that of the bending means, such ways serving for substantially supplying the current to the wire.

If desired, the feeding rollers 101, 102 forming an obtuse angle may be coupled by means of a Cardan joint 111, 112, respectively. In this case, one of the two worm shafts 105, 106 may be omitted.

In a further embodiment shown in Fig. 12 the two wires 24 and 25 are likewise fed in a straight line up to the contact point K, i. e. the wires are not bent in the nozzle head. In this embodiment, a double feeding gear is provided for moving the wires 24 and 25 through the pistol. The shafts of said gear are driven from a common driving shaft 201 operatively connected to the two roller gears by means of bevel wheels. Preferably, an electromotor, not shown, is used for driving the common shaft 201 by means of an intermediate flexible shaft as pointed out above with reference to Figs. 1 and 2.

The inner space of the electro-spraying pistol according to Fig. 12 is divided in such a manner that the compressed air for spraying the molten metal merely flows along one of the two wires, such as the wire 24. The compressed air flows from a connection joint 202 into the inner chamber of the pistol along the wire 24 and preferably concentrically thereto. The feeding mechanism of the wire 25 is the same as that of the wire 24. However, as stated, the wire 25 is not exposed to the compressed air within the pistol. This is no consequence as the contact point K of the two wires lies in the axis of the wire 24 surrounded by the compressed air flow so that the melted particles of both wires underlie the air stream and are thus projected to the work piece.

With reference to Fig. 12 it may be pointed out that this figure represents the preferred position of the pistol when using it. In this position the wire 24 and the air stream along this wire are situated below the other wire 25 and its appropriate parts. Moreover, it is of importance that by the pistol according to Fig. 12 a small cone of divergence of the sprayed material may be obtained. This is not always the case in metal spraying pistols in which two wires pass the nozzle system in oblique relation due to the fact that in these pistols there are remarkable air eddies. Therefore, a bundling effect of the cone of divergence may be enforced only by the means explained above.

It has been found that in a continuous operation of the pistol a current supply to the wires 24 and 25 via rollers (38, 39 in Fig. 2) is not always free from objections under certain conditions due to the fact that each roller contacts the wire at a point only, so that with currents of 200 to 300 ampere the current density is extremely high, resulting in a thermal overload and burning out of the contact rollers.

Figure 13:
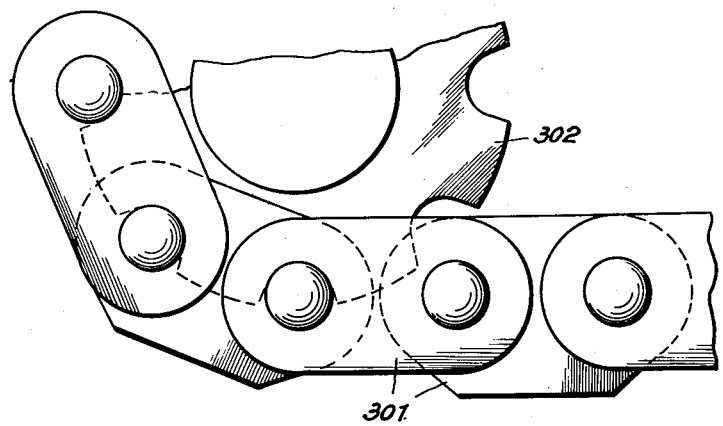
Figs. 13 and 14 show a detail of the pistol for an improved current supply.
Figure 14:
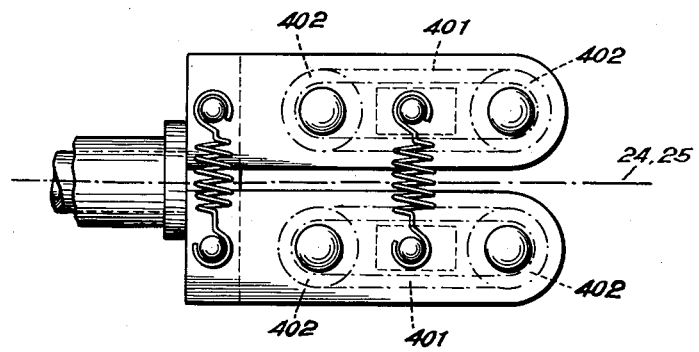

Figs. 13 and 14 represent a special embodiment obviating these drawbacks. This embodiment shows for the current supply to the wires a link chain, the links 301 thereof co-operating with a toothed wheel 302 in the manner to be seen from Fig. 13. Fig. 14 schematically represents the entire contact device having chains 401 and chain driving wheels 402.

In contradistinction to a point contact in such an arrangement contact areas will be obtained preferably by providing recesses in the individual chain links or members corresponding to the wire form. The chain will be driven either by the wire being fed or by the driving shaft of the wire feeding device imparting to the chain a velocity which at times corresponds to the wire movement. In both cases, there is no movement of the chain relative to the wire similar to the driving chain of a caterpillar tractor in which the crawler does not move relative to the sole. In this manner, the invention results not only in a proper contact and thus a proper current transition to the wires but also in an extremely small wear of these important pistol members.

According to the invention, means are also provided for preventing the wires to be sprayed or sputtered from becoming live without supplying compressed air to the pistol. Preferably the arrangement is such that the short circuit of the pistol remains switched off as long as the electromotor for driving the feeding roller gear is not started. Accordingly, a switch for connecting the wires to be sprayed to any suitable source of current is locked in such a manner that switching on is possible only if compressed air flows to the pistol and preferably the feeding roller gear has become operative. Furthermore, it is advisable to provide means for automatically actuating the switch as soon as the flow of compressed air and the driving motion of the wire feeding has been interrupted for any reason. In the diagram of connections according to Fig. 15 the pistol is generally shown as at P whilst the air conduit is designated at L. This conduit comprises a valve V. If this valve is open, so that compressed air is flowing to the pistol, a contact member $K_1$ is closed and a second contact member $K_2$ may be closed likewise by depressing a push button. If, however, the valve V is closed the contact member $K_1$ and $K_2$ are open and the contact $K_2$ has no access, or is locked in any suitable manner.

The short circuit of the pistol may be closed by a relay switch $S_1$ after having closed the contact $K_2$. By closing this contact, however, neither the coil or spool $Sp$ of the relay switch $S_1$ will not yet be excited as long as a knife-switch I is still in its open position as shown in Fig. 15. This knife-switch is operatively connected to a motor switch $S_2$ for switching on the circuit of the motor M. Upon closing the switch $S_2$ for starting the motor M, and thus the feeding roller gear of the pistol, said knife-switch will be closed thereby also closing the circuit comprising the coil or spool $Sp$ of the relay switch $S_1$. After actuation of the relay switch the circuit of the spool is as follows: Contact $K_1$, knife switch I and a relay contact member H of the relay switch $S_1$. If the valve V is closed, or the circuit of the driving motor M interrupted, likewise the circuit of the spool will be interrupted at $SK_1$ and I. Accordingly, the short circuit of the pistol will be automatically interrupted by the relay switch $S_1$.

While the invention has been described and illustrated by preferred embodiments shown in the drawings it is to be understood that the description is not to be taken in a limiting sense, many modifications of the embodiments shown being possible within the scope of the invention. Accordingly, the invention is regarded as broadly inclusive of all equivalent constructions without departing from the spirit of the invention as defined in the appended claims.

What I claim is:

1. An electro metal spraying pistol for melting the ends of two metal wires in a short circuit arc and spraying the molten metal onto the surface to be treated by means of a compressed air jet, comprising a nozzle head having a discharge mouth at its front end, a conduit for supplying a flow of compressed air to the discharge mouth, feeding and guiding means for continually feeding and guiding the wires through said nozzle head and the discharge mouth, said feeding means including a multiple feeding roller gear arranged at the rear side of said nozzle head, a valve in said conduit, switch means for controlling the flow of current to the pistol, and means for preventing said switch means from switching on the short circuit as long as said valve is closed.

2. An electro metal spraying pistol for melting the ends of two metal wires in a short circuit arc and spraying the molten metal onto the surface to be treated by means of a compressed air jet, comprising a nozzle head having a discharge mouth at its front end, a conduit for supplying a flow of compressed air to the discharge mouth, feeding and guiding means for continually feeding and guiding the wires through said nozzle head and the discharge mouth, said feeding means including a multiple feeding roller gear arranged at the rear side of said nozzle head, a valve in said conduit, switch means for controlling the short circuit, and means for preventing starting actuation of said switch means as long as said valve is closed and the roller gear is in rest.

3. In an electric metal spraying pistol for melting a pair of contacting metal wires by a short circuit arc and spraying the molten metal against a surface by means of a jet of compressed air, the combination with a common casing of a first series of pairs of rollers for serially engaging one of the wires, a second series of rollers for serially engaging the other wire, said first and second series of rollers being mounted on said casing, nozzle means connected to said casing, means for uniformly driving said rollers so as continually to feed said wires to said nozzle, means for leading said wires through said nozzle means into point contact engagement beyond the nozzle means, said wire leading means including means for bending said wires against each other, connecting means arranged within the region of said bending means for supplying electric current to said wires including electrical conductor means between said nozzle means and said rollers for supplying electric current to the wires, and means connected with said casing for applying a jet of compressed air to the wires near said contact point.

4. In an electric metal spraying pistol for melting the ends of two metal wires in a short circuit arc and spraying the molten metal onto a surface to be treated by means of a jet of compressed gas, in combination a first casing, a first plurality of pairs of rollers for engaging one of said wires in series and arranged in said first casing, a second plurality of pairs of rollers for engaging the other of said wires in series and arranged in said first casing, means for uniformly driving both said pluralities of pairs of rollers for continually feeding both said wires in parallel relationship with respect to one another and in the same direction, a second casing connected with said first casing, means for separating said two casings one from another, means for leading said wires through said separating means, a nozzle member connected with said second casing opposite said separating means, means arranged in said second casing for bending both said wires against each other, connecting means arranged within the region of said bending means for supplying electric current to said wires, means arranged in said second casing for leading said wires through said nozzle member in order to secure contact engagement of said wires beyond said nozzle member, and means connected with said second casing for applying a jet of compressed gas to said both wires near the point of said contact engagement.

5. In an electric metal spraying pistol for melting the ends of two metal wires in a short circuit arc and spraying the molten metal onto a surface to be treated by means of a jet of compressed gas, in combination a first casing, a first plurality of pairs of rollers engaging one of said wires in series and arranged in said first casing, a second plurality of pairs of rollers engaging the other of said wires in series and arranged in said first casing, means for uniformly driving both said pluralities of pairs of rollers for continually feeding both said wires in parallel relationship one with respect to another and in the same direction, a second casing connected with said first casing, means for separating said two casings from one another, means for leading said wires through said separating means, a nozzle member connected with said second casing opposite said separating means, means arranged in said second casing for bending both said wires against each other, connecting means arranged within the region of said bending means for supplying electric current to said wires, means arranged in said second casing for leading said wires through said nozzle member in order to secure contact engagement of said wires beyond said nozzle member, and means for conducting compressed gas to the interior of said second casing.

6. The invention as claimed in claim 5, said connecting means for supplying electric current to the wires being arranged within the region of said bending means and said connecting and bending means including a plurality of rollers having their axes angularly arranged with respect to one another.

7. The invention as claimed in claim 5, said connecting means for supplying electric current to the wires comprising electric contact rollers mounted in the vicinity of said bending rollers and means for resiliently pressing said contact rollers to the wires to be sprayed.

8. The invention as claimed in claim 5, said bending means comprising bending rollers having guiding grooves for receiving the wires.

9. The invention as claimed in claim 5, said nozzle member having at least a part consisting of ceramic material having great resistance to heat, wear and tear.

10. An electric metal spraying pistol for melting the ends of two metal wires in a short circuit arc and spraying the molten metal onto a surface to be treated by means of a jet of compressed gas, comprising in combination a first casing, a first plurality of pairs of rollers for engaging one of said wires in series and arranged in said first casing, a second plurality of pairs of rollers for engaging the other of said wires in series and arranged in said first casing, means for uniformly driving both said pluralities of pairs of rollers for continually feeding both said wires in parallel relationship with respect to one another and in the same direction, said first casing having a cover adapted to be opened, at least two feeding rollers rotatably mounted in said first casing parallel to each other, each of said rollers supporting a toothed rim and a feeding rim for engaging the wire to be sprayed, at least two counter-rollers mounted in said cover for rotation and movement against said feeding rollers.

each of said counter-rollers being also provided with a toothed rim and a feeding rim, the toothed rim of the said feeding rollers and said counter-rollers being in engagement in the closed position of said cover, spring means for resiliently pressing said counter-roller feeding rims onto the wires, a second casing connected with said first casing, means for separating said two casings from one another, means for leading said wires through said separating means, a nozzle member connected with said second casing opposite said separating means, means arranged in said second casing for bending both said wires against each other, connecting means arranged within the region of said bending means for supplying electric current to said wires, means arranged in said second casing for leading said wires through said nozzle member in order to secure contact engagement of said wires beyond said nozzle member, and means connected with said second casing for supplying a jet of compressed gas to said both wires near the point of said contact engagement.

11. An electric metal spraying pistol for melting the ends of two metal wires in a short circuit arc and spraying the molten metal onto a surface to be treated by means of a jet of compressed gas, comprising in combination a first casing, a first plurality of pairs of rollers engaging one of said wires in series and arranged in said first casing, a second plurality of pairs of rollers engaging the other of said wires in series and arranged in said first casing, means for uniformly driving both said pluralities of pairs of rollers for continually feeding both said wires in parallel relationship one with respect to another and in the same direction, a second casing connected with said first casing, means for separating said two casings from one another, means for leading said wires through said separating means, a nozzle member connected with said second casing opposite said separating means, means arranged in said second casing for bending both said wires against each other, connecting means arranged within the region of said bending means for supplying electric current to said wires, means arranged in said second casing for leading said wires through said nozzle member in order to secure contact engagement of said wires beyond said nozzle member, a fluid pressure conduit communicating with said second casing for leading a fluid pressure flow into it, the flow cross-section of said conduit at its entrance end being greater than the flow cross-section at its discharge end connected to said second casing, the last named cross-section being greater than the flow cross-section of the fluid pressure flow upon entering said nozzle head and the last named flow cross-section being greater than the flow cross-section of the fluid pressure flow upon leaving said nozzle head so that the fluid pressure flow will be dammed-up in the pistol.

12. The invention as claimed in claim 11, in which said nozzle head is provided with a second annular channel communicating with the hollow space of said nozzle head and concentrically surrounding the discharge mouth for discharging a cylindrical jet limiting the cone of divergence of the central jet of the discharge mouth.

13. The invention as claimed in claim 11, in which said nozzle head is provided with means for discharging a second annular jet concentrically surrounding the discharge mouth and thus the central jet thereof.

14. An electrical metal spraying pistol for melting the ends of two metal wires in a short circuit arc and spraying the molten metal onto a surface to be treated by means of a jet of compressed gas, comprising in combination a first casing, a first plurality of pairs of rollers for engaging one of said wires in series and arranged in said first casing, a second plurality of pairs of rollers for engaging the other of said wires in series and arranged in said first casing, means for uniformly driving both said pluralities of pairs of rollers for continually feeding both said wires in parallel relationship with respect to one another and in the same direction, a second casing connected with said first casing, means for separating said two casings one from another, means for leading said wires through said separating means, a nozzle member connected with said second casing opposite said separating means, means arranged in said second casing for bending both said wires against each other, means for removably connecting said nozzle member to the front wall of said second casing for obtaining easy access to said bending means within said nozzle member, connecting means arranged within the region of said bending means for supplying electric current to said wires, means arranged in said second casing for leading said wires through said nozzle member in order to secure contact engagement of said wires beyond said nozzle member, and means connected with said second casing for applying a jet of compressed gas to said both wires near the point of said contact engagement.

15. An electric metal spraying pistol for melting the ends of two metal wires in a short circuit arc and spraying the molten metal onto a surface to be treated by means of a jet of compressed gas, comprising in combination a first casing, a first plurality of pairs of rollers for engaging one of said wires in series and arranged in said first casing, a second plurality of pairs of rollers for engaging the other of said wires in series and arranged in said first casing, means for uniformly driving both said pluralities of pairs of feeding rollers for continually feeding both said wires in parallel relationship with respect to one another and in the same direction, a worm gear having driving connection with the gear of the feeding rollers, means for operatively connecting the worm axis of said worm gear to a motor driven shaft, a second casing connected with said first casing, means for separating said two casings one from another, means for leading said wires through said separating means, a nozzle member connected with said second casing opposite said separating means, means arranged in said second casing for bending both said wires against each other, connecting means arranged within the region of said bending means for supplying electric current to said wires, means arranged in said second casing for leading said wires through said nozzle member in order to secure contact engagement of said wires beyond said nozzle member, and means connected with said second casing for applying a jet of compressed gas to said both wires near the point of said contact engagement.

16. The invention as claimed in claim 15, in which one roller of the first plurality of pairs of rollers and one roller of the second plurality of pairs of rollers are permanently arranged on a common axis.

17. An electric metal spraying pistol for melting the ends of two metal wires in a short circuit arc and spraying the molten metal onto a surface to be treated by means of a jet of compressed gas, comprising in combination a first casing, a first plurality of pairs of rollers for engaging one of said wires in series and arranged in said first casing, a second plurality of pairs of rollers for engaging the other of said wires in series and arranged in said first casing, means for uniformly driving both said pluralities of pairs of rollers for continually feeding both said wires in parallel relationship with respect to one another and in the same direction, a second casing connected with said first casing, means for separating said two casings one from another, means for leading said wires through said separating means, a nozzle member connected with said second casing opposite said separating means, means arranged in said second casing for bending both said wires against each other, connecting means arranged within the region of said bending means for supplying electric current to said wires, said connecting means including a link chain like the crawler of a caterpillar tractor, the links of which have recesses corresponding to the wire for providing contact area for the transition of current to the wires, and means for moving the chain without any motion of the chain relative to the wire, means arranged in said second casing for leading said wires through said nozzle member in order to secure contact engagement of said wires beyond said nozzle member, and means connected with said second casing for applying a jet of compressed gas to said both wires near the point of said contact engagement.

References Cited in the file of this patent

UNITED STATES PATENTS

| | | |
|---|---|---|
| 1,133,507 | Schoop | Mar. 30, 1915 |
| 1,511,977 | Meurer | Oct. 14, 1924 |
| 1,569,564 | Muller | Jan. 12, 1926 |
| 1,940,814 | Saeger | Dec. 26, 1933 |
| 2,040,030 | Snyder | May 5, 1936 |